Dec. 7, 1965       H. L. KELLOGG        3,222,592
             VOLTAGE STABILIZING CIRCUITS
Filed Dec. 19, 1962                    2 Sheets-Sheet 1

INVENTOR.
Harry L. Kellogg,
BY Henry J. Marciniak
Attorney.

Dec. 7, 1965    H. L. KELLOGG    3,222,592
VOLTAGE STABILIZING CIRCUITS
Filed Dec. 19, 1962    2 Sheets-Sheet 2
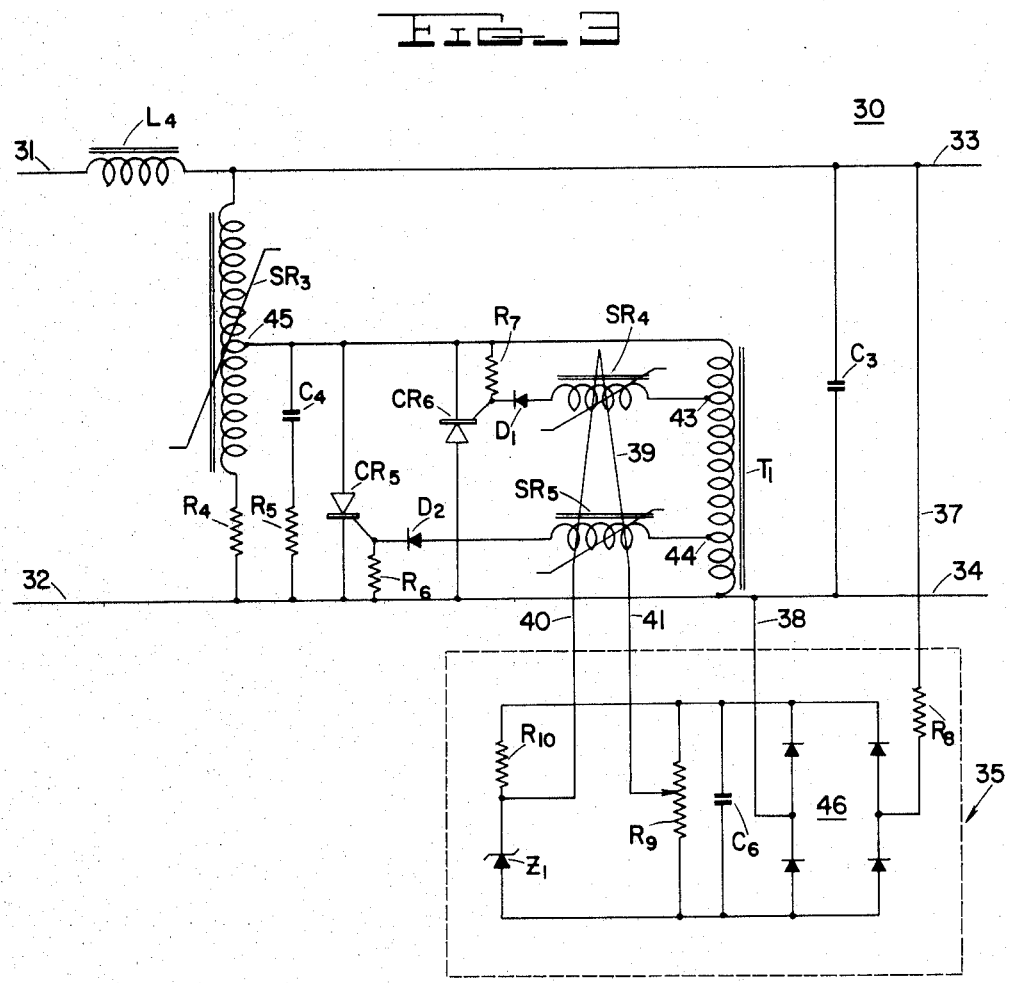
INVENTOR.
Harry L. Kellogg,
BY Henry J. Marciniak
Attorney.

United States Patent Office 3,222,592
Patented Dec. 7, 1965

3,222,592
VOLTAGE STABILIZING CIRCUITS
Harry L. Kellogg, Fort Wayne, Ind., assignor to General Electric Company, a corporation of New York
Filed Dec. 19, 1962, Ser. No. 245,842
6 Claims. (Cl. 323—89)

This invention relates to electrical circuits and more particularly to voltage stabilizing circuits wherein multilayer solid state devices, such as controlled rectifiers, are employed to augment the function of a saturable reactor in a ferro-resonant voltage stabilizer.

In a conventional magnetic voltage stabilizer, a high leakage reactance transformer is used in conjunction with a capacitor which is connected across the secondary winding and an extension thereof. Such a conventional magnetic voltage stabilizer may be represented by an equivalent circuit which includes a linear reactor in series with the load and which includes a capacitor and a saturable reactor connected in parallel with the load. The voltage stabilizer functions as a nonlinear type of oscillatory circuit. If the hysteresis loop of the core material of the saturable reactor is properly rectangular, the average half wave output of the voltage circuit is substantially constant over a wide range of variations in the input voltage so long as the supply frequency remains constant. The output voltage in such a circuit is a function of the frequency, the effective cross-sectional area of the core, the number of reactor turns, and the saturation flux density.

In application Serial No. 6,686 for a "Magnetic Voltage Stabilizer Employing Controlled Silicon Rectifiers" filed in the name of Erich W. Manteuffel on February 4, 1960 and assigned to the same assignee of the present invention, there is disclosed and claimed a voltage stabilizing circuit in which saturable reactors are used in a firing circuit for a pair of controlled rectifiers to control the voltage level to which a capacitor charges, thereby to regulate the output voltage. In such voltage stabilizing circuits, the capacitor has such a value that it will draw more volt-amperes than the load, and consequently, the voltage on the capacitor tends to become greater than the input voltage. However, the switching action of the controlled rectifier causes the voltage across the capacitor to be reversed at a point in each cycle so that the steady state value of the capacitor voltage is limited. The volt-second capacity of the saturable reactors in the firing circuit is used to determine the average output voltage of the stabilizer.

Since the volt-second capacity of the saturable reactors is used to control the point at which the controlled rectifiers are fired to discharge the capacitor, it will be appreciated that the main discharge current from the capacitor in such voltage stabilizing circuits flows through the controlled rectifiers and not through the saturable reactor. Although, this type of voltage stabilizing circuit has been eminently satisfactory in practice, the controlled rectifiers must handle the maximum volt-amperes required of the capacitor. Since the volt-ampere rating of the capacitor may be approximately from two to three times the volt-ampere rating of the load, it will be apparent that in such voltage stabilizing circuits the controlled rectifiers must be capable of handling more power than is supplied to the load. This results in the use of controlled rectifiers that are relatively expensive. It is desirable in some applications that for a given power output the volt-ampere requirements of the controlled rectifier or other solid state control device used in the voltage stabilizing circuit be significantly reduced to permit the use of relatively less expensive devices.

Accordingly, it is a general object of the present invention to provide an improved voltage stabilizing circuit.

Another object of this invention is to provide an improved voltage stabilizing circuit with solid state control devices for use in conjunction with saturable reactors to regulate the output voltage.

It is a further object of the present invention to provide an improved voltage stabilizing circuit in which solid state control devices may be employed having comparatively reduced volt-ampere requirement as compared with voltage stabilizing circuits in which the controlled rectifiers are required to handle the total volt-amperes of the capacitor in the circuit.

In accordance with one form of the invention, I have provided an improved voltage stabilizing circuit in which an impedance element and a saturable reactor having a tap are connected in series circuit relation across the input and in circuit with a stabilizing capacitor. The tap on the saturable reactor divides the reactor into a first winding portion and a second winding portion, and at least one multilayer semiconductor control device is connected in parallel circuit relation with one of the winding portions and the impedance element. A firing circuit for switching the multilayer semiconductor control device into a conducting state at selected intervals is coupled with the semiconductor control device.

When the semiconductor control device is switched to a conducting state, the effective volt-second capacity of the saturable reactor is changed to thereby cause the stabilizing capacitor to discharge through the second winding portion at a predetermined point in each half cycle. This maintains the average value of the output voltage substantially constant. The impedance element in series with the saturable reactor limits the amount of circulating current passing through the first winding portion of the saturable reactor during the conducting interval of the semiconductor control device. Unless this current is limited, the second portion of the saturable reactor may not saturate. During the nonconducting interval the voltage across the first winding portion and impedance element is less than the capacitor voltage. It is possible, therefore, to employ semiconductor control devices having relatively smaller volt-ampere ratings since the control device does not have to handle the maximum volt-amperes of the stabilizing capacitor.

The subject matter which I regard as my invention is set forth in the appended claims. The invention itself, however, together with further objects and advantages thereof, may be better understood by referring to the following description taken in conjunction with the accompanying drawings in which:

FIGURE 3 illustrates a modification of the embodiment of the invention shown in FIGURE 2 in which a reference and feedback control circuit is employed to fire the controlled rectifiers at selected intervals in response to deviations in the output voltage from a selected level.

Figure 1:
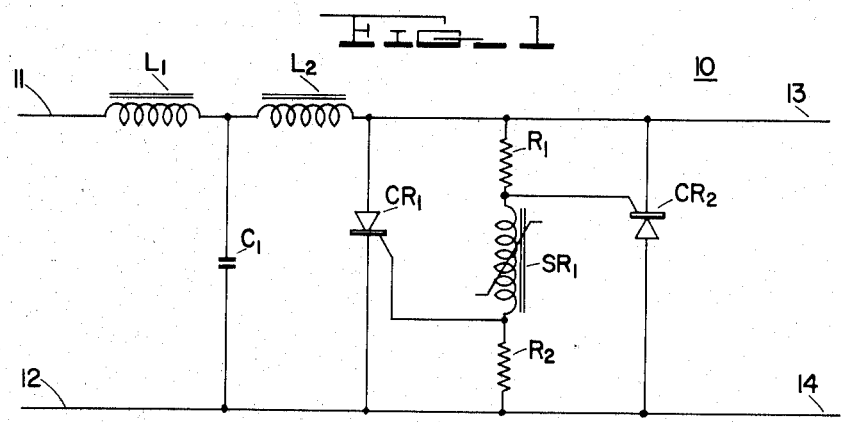
FIGURE 1 is a schematic circuit diagram of a voltage stabilizing system of the prior art to which the present invention relates.

In FIGURE 1 I have illustrated a schematic diagram of a voltage stabilizing circuit 10 to which the present invention relates and which shall now be described in more detail for the purpose of explaining the improved circuit arrangement of the invention. For a more detailed description of the voltage stabilizing circuit 10, reference may be had to the aforementioned Manteuffel patent application.

As is shown in FIGURE 1, the voltage stabilizing circuit 10 is comprised of linear reactors $L_1$ and $L_2$, a stabilizing capacitor $C_1$, the controlled rectifiers $CR_1$ and $CR_2$, a saturable reactor $SR_2$, resistors $R_1$ and $R_2$, input leads 11, 12 and output leads 13, 14. Input leads 11 and 12 are adapted for connection to an alternating source, such as a 120 volt, 60 cycle supply, and output leads 13 and 14 are adapted for connection to a load (not shown). Resistors $R_1$ and $R_2$ are gate resistors for controlled rectifiers $CR_1$, $CR_2$ across which a signal is obtained to fire the controlled rectifiers $CR_1$, $CR_2$. A first linear reactor $L_1$ provides an inductive reactance having a value with respect to the capacitive reactance of the capacitor $C_1$ such that critical frequency is approached but is not reached. The linear reactor $L_2$ controls the discharge time interval of the stabilizing capacitor $C_1$.

The voltage stabilizing circuit 10 operates as follows: if we assume that during an arbitrary half cycle of operation, the polarity of the voltage at lead 11 is positive with respect to lead 12, and further, if we assume that the volt-time integral has reached a value sufficient to cause saturation in the saturable reactor $SR_1$, the flow of current through the saturable reactor $SR_1$ will increase sharply at the point of saturation. The voltage across the resistor $R_2$ will be such that its upper end as seen in FIGURE 1 will be positive with respect to the lower end, and controlled rectifier $CR_1$ will be switched into conduction.

When the controlled rectifier $CR_1$ is triggered into conduction, the stabilizing capacitor $C_1$ is discharged, and the discharge current will flow through the linear reactor $L_2$ and the controlled rectifier $CR_1$. The voltage across the capacitor $C_1$ will now reverse, and the lower plate of capacitor $C_1$, as seen in FIGURE 1, will be positive. Controlled rectifier $CR_1$ will revert to a blocking state when the current flow through the controlled rectifier $CR_1$ falls below its holding current value. When controlled rectifier $CR_1$ commutates, the saturable reactor $SR_1$ will now start absorbing volt-seconds in the opposite direction of magnetization. When it saturates in the opposite direction, the current flow through the saturable reactor $SR_1$ will be such that the lower end of the resistor $R_1$ will be positive with respect to the upper end. Thus, controlled rectifier $CR_2$ will be switched into conduction to discharge capacitor $C_1$ in the opposite direction. The charge on the capacitor $C_1$ is reversed so that the upper plate is now positive with respect to the lower plate. When the current falls off to zero, controlled rectifier $CR_2$ will revert to a blocking state.

In this type of stabilizing circuit, it will be apparent that the voltage of the capacitor $C_1$ is reversed before it can reach a predetermined steady state value. This is accomplished by firing the controlled rectifiers $CR_1$ and $CR_2$ at a predetermined point in each half cycle, the firing point being determined by the volt-second capacity of the saturable reactor $SR_1$. The average output voltage across the leads 13, 14 will be substantially constant provided the frequency of the alternating power supply is constant. Further, it will be understood that the controlled rectifiers $CR_1$ and $CR_2$ handle the discharge current of the capacitor $C_1$ and therefore must be capable of handling the volt-amperes of the capacitor $C_1$. Since the volt-amperes of the capacitor $C_1$ may be from two to three times the load volt-amperes, it will be appreciated that the controlled rectifiers in the type of stabilizing circuits shown in FIGURE 1 must handle appreciably more power than the load.

Figure 2:
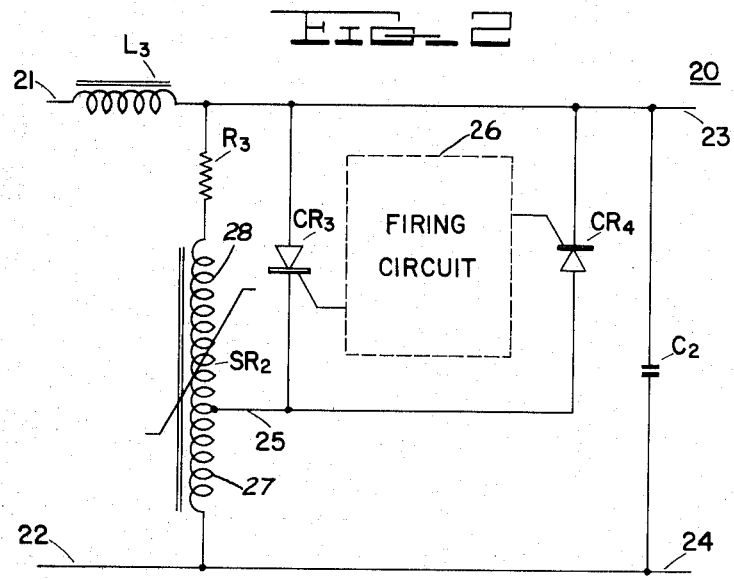
FIGURE 2 is a schematic circuit diagram of the improved voltage stabilizing circuit of the invention.

Referring now to FIGURE 2, I have shown therein a voltage stabilizing circuit 20 embodying one form of my invention. The voltage stabilizing circuit 20 includes a pair of input leads 21, 22 adapted for connection to a suitable alternating supply, and a pair of output leads 23, 24 adapted for connection to a load (not shown). The voltage stabilizing circuit 20 is comprised of a linear reactor $L_3$, an impedance element $R_3$, a saturable reactor $SR_2$ having a tap 25 which divides the reactor $SR_2$ into winding portions 27, 28, a pair of controlled rectifiers $CR_3$ and $CR_4$ connected in inverse parallel relation across a portion of the saturable reactor $SR_2$ and the impedance element $R_3$. The linear reactor $L_3$ in conjunction with the capacitor $C_1$ functions as an oscillatory circuit operating near but not at the resonant frequency.

The multilayer semiconductor control devices $CR_3$, $CR_4$ and the other control devices used in the illustrated embodiments of my invention were silicon controlled rectifiers. These solid state devices are essentially PNPN semiconductor devices formed of a plurality of semiconductor layers formed of P and N type of semiconductor material. In the drawings, the anode of the silicon controlled rectifier is identified by the arrow symbol which represents a connection at the end zone of P-type material. The cathode is identified by the horizontal line which represents a connection at the end zone of N-type material. The gate is identified by a diagonal line extending from the cathode and represents a connection at intermediate zone of P-type material.

Although silicon controlled rectifiers have been used in the preferred embodiment of the invention described herein, it will be appreciated that other multilayer semiconductor control devices such as four layer or five layer diodes may be used in the practice of the invention.

A four layer diode or a Shockley diode, as it is frequently referred to, is a two terminal unidirectional semiconductor control device having a stable high impedance state and a stable low impedance state. The four layer diode is switched into a conducting or a low impedance state by causing the voltage across the terminals to exceed the switching voltage. The four layer diode is switched to a nonconducting or a high impedance state by causing the current flow through the diode to fall below its holding current value. A five layer diode has essentially the same characteristics as the four layer diode except that the five layer diode is a bidirectional switching device and is switched to a conducting state when the voltage across its terminal exceed the switching voltage irrespective of its polarity.

In the voltage stabilizing circuit arrangement of the invention the stabilizing capacitor $C_2$ is connected through the controlled rectifiers $CR_3$, $CR_4$ to the tap 25 of the saturable reactor $SR_2$. The gates of the controlled rectifiers $CR_3$, $CR_4$ are phase controlled so that the voltage across the stabilizing capacitor $C_2$ is applied to the tap 25 at a predetermined point in each half cycle. The point in each half cycle at which the controlled rectifiers $CR_3$ and $CR_4$ are fired by a firing circuit 26 effectively determines the volt-second capacity of saturable reactor $SR_2$. The impedance of the impedance element $R_3$, which may be either a reactor or resistor, was selected so that exciting current will flow through the saturable reactor $SR_2$ during the pre-saturation period. Further, the impedance element $R_3$ was selected to provide sufficient impedance in the loop which includes the controlled rectifier $CR_3$ or $CR_4$, the tap 25 and the shunted winding portion 28 of the saturating reactor $SCR_2$ in order to limit the circulating current in the loop. Since the voltage across the controlled rectifiers $CR_3$, $CR_4$ is less than the capacitor voltage, it is possible to employ controlled rectifiers having a lesser volt-ampere rating than would be the case if the control device was required to handle the full voltage of the stabilizing capacitor $C_2$.

Let us assume that the voltage applied across the input leads 21, 22 is such that the stabilizing capacitor $C_2$ is being charged with a voltage having a polarity such that the upper plate of capacitor $C_2$, as seen in FIGURE 2, is positive with respect to the lower plate. During this interval, the saturable reactor $SR_2$ is absorbing volt-seconds. The controlled rectifiers $CR_3$, $CR_4$ are in a blocking state and the exciting current of the saturable reactor $SR_2$ flows through the impedance element $R_3$. When the controlled rectifier $CR_3$ is fired at a predetermined point in the half cycle by firing circuit 26, the tap 25 is connected through the controlled rectifier $CR_3$ to the positive plate of the capacitor $C_2$ thereby changing the effective volt-second capacity of the saturable reactor $SR_2$ to a lower value since the winding portion 27 is now connected in the discharge path of capacitor $C_2$.

When the saturable reactor $SR_2$ saturates, the impedance of the saturable reactor $SR_2$ decreases sharply, and the stabilizing capacitor $C_2$ will discharge through the lower winding portion 27 of saturable reactor $SR_2$. The discharge current also flows through the controlled rectifier $CR_3$ which is in a conducting state. It will be appreciated that if there was no impedance interposed in the path of this discharge current the current through the loop, which includes the winding portion 28 of the saturable reactor $SR_2$ the resistor $R_3$ and the controlled rectifier $CR_3$, would increase very rapidly for brief period. The impedance introduced into the circuit by the resistor $R_3$ not only limits this circulating current but also allows the use of the tap connected controlled rectifiers $CR_3$, $CR_4$ so that the volt-ampere requirements of the controlled rectifiers $CR_3$ and $CR_4$ can be maintained within desired limits.

At the beginning of the next half cycle of the alternating current supply, controlled rectifier $CR_3$ is in a blocking state, and the voltage across the stabilizing capacitor $C_2$ is of opposite polarity. The saturable reactor $SR_2$ will start absorbing volt-seconds in the opposite direction. When the controlled rectifier $CR_4$ is fired at a predetermined point in the half cycle, tap 25 is now connected to the negatively charged plate of capacitor $C_2$. The stabilizing capacitor $C_2$ is then discharged through the winding portion 27 of saturable reactor $SR_2$, and controlled rectifier $CR_4$, the impedance of the resistor $R_3$ limits the amount of circulating current that passes through the controlled rectifier $CR_4$. After the voltage on the stabilizing capacitor $C_2$ reverses, controlled rectifier $CR_4$ again reverts to a blocking state, and one complete cycle of operation is now completed.

Referring now to FIGURE 3, I have shown a voltage stabilizing circuit 20, which is substantially similar in operation to the circuit shown in FIGURE 2, except that the controlled rectifiers $CR_5$ and $CR_6$ are fired at selected intervals in each half cycle as determined by the difference between the output voltage and a reference voltage. The voltage stabilizing circuit 30 is provided with a pair of input leads 31, 32 for connection to a suitable power supply and a pair of output leads 33, 34 provided for connection to a load.

It will be seen that the voltage stabilizing circuit 30 includes the linear inductor $L_4$, and a stabilizing capacitor $C_3$, which function as an oscillatory circuit. The point in each half cyle, at which one of the controlled rectifiers $CR_5$, $CR_6$ is fired, is controlled by a control circuit 35. It will be seen that control circuit 35 is connected in circuit with the output leads 33, 34 by leads 37, 38 and with a control winding 39 by means of leads 40, 41. The control winding 39 is inductively coupled with a pair of small saturable reactors $SR_4$, $SR_5$. The volt-second capacity of saturable reactors $SR_4$, $SR_5$ is varied by the current flowing through the control winding 39 to control the point in each half cycle at which the controlled rectifiers $CR_5$ and $CR_6$ are fired. Saturable reactors $SR_4$ and $SR_5$ are connected at one end to the diodes $D_1$, $D_2$ and the other end to the taps 43, 44 of an autotransformer $T_1$. The taps 43, 44 are brought out on the autotransformer $T_1$ at a point so that the peak voltage between the gate and the cathode of the controlled rectifiers $CR_5$ and $CR_6$ is not exceeded. Diodes $D_1$, $D_2$ insure that only positive pulses are supplied to the controlled rectifier $CR_5$, $CR_6$. A serially connected capacitor $C_4$ and a resistor $R_5$ are connected in parallel circuit with the portion of the saturable reactors $SR_3$ under the tap 45 and resistor $R_4$ in order to dissipate stored energy in the saturable reactor $SR_3$. The resistors $R_6$ and $R_7$ serve as gate loading resistors for the controlled rectifiers $CR_5$ and $CR_6$, respectively.

Referring more particularly now to the control circuit 35, it will be seen that a resistor $R_8$ is provided to limit the current to the bridge rectifier 46. A capacitor $C_6$ filters the feedback, and a variable resistor $R_9$, a resistor $R_{10}$ and a Zener diode $Z_1$ serve as a reference bridge.

Control of the output voltage across leads 33, 34 is accomplished by changing the effective volt-second capacity of the saturable reactor $SR_3$ by firing the silicon controlled rectifiers $CR_5$, $CR_6$ at selected points during each half cycle to place the upper portion of the reactor $SR_3$ in the discharge path of the capacitor $C_3$. The point in each half cycle at which the controlled rectifiers $CR_5$, $CR_6$ are fired is automatically controlled by the control circuit 35 which senses the output voltage to provide a current in the control winding 39 that is proportional to deviations in the output voltage from a reference voltage provided by the Zener diode $Z_1$. It will be appreciated that as the current in the control winding 39 increases, this current will cause the saturable reactors $SR_4$ and $SR_5$ to have a greater volt-second capacity and thereby delay the phase angle at which the controlled rectifiers $CR_5$ and $CR_6$ are fired. For this condition, the output voltage across output leads 33, 34 will be increased. Conversely, when the reset current in the control winding decreases in value, the saturable reactors $SR_4$, $SR_5$ will have a lesser volt-second capacity. Hence, the phase angle, at which the controlled rectifiers $CR_5$, $CR_6$ are fired, will be advanced to produce a lower output voltage.

From the foregoing description, it will be apparent that it is possible to employ controlled rectifiers, having a relatively smaller volt-ampere rating as compared with other similar circuits of the prior art. Further, it will be seen that the stabilizing circuit is readily adaptable to feedback control arrangements.

While this invention has been explained by describing particular exemplifications thereof, it will be apparent to those skilled in the art that many modifications may be made. It is to understood, therefore, that I intend by the appended claims to cover all such modifications that fall within the true spirit and scope of my invention.

What I claim as new and desire to secure by Letters Patent of the United States is:

1. A voltage stabilizing circuit for connection to a source of potential and for supplying a substantially constant output voltage therefrom, said voltage stabilizing circuit comprising: an input means including leads for connection to the source of potential and including a linear reactor connected in circuit with one of said leads to cause current from said source to pass therethrough, a saturable reactor, said saturable reactor including a tap dividing said saturable reactor into a first winding portion and a second winding portion, an impedance element connected in a series circuit relation with said saturable reactor, a stabilizing capacitor, circuit means connecting said stabilizing capacitor in circuit with said input means and in parallel circuit relation with the series circuit of said saturable reactor and said impedance element, at least one multilayer of semiconductor control device connected in parallel circuit relation with the series connection of one of said winding portions and said impedance element, output leads for connecting said capacitor in circuit with a load, and means for firing said multilayer semiconductor control device at selected intervals from a nonconducting to a conducting state to cause said stabilizing capacitor to discharge through said second winding portion and change the effective volt-second capacity of said saturable reactor for providing a substantially constant output voltage.

2. A voltage stabilizing circuit for operation from a source of potential, said voltage stabilizing circuit comprising: an input means for connection to the source of potential and including a linear reactor, an impedance element, a saturable reactor connected in series circuit relation with said impedance element, said saturable reactor including a tap dividing said saturable reactor into a first and second winding portion, a stabilizing capacitor circuit means for connecting said impedance element and said saturable reactor in parallel circuit relation with said stabilizing capacitor and in circuit with said input means, said circuit means including leads adapted for connection with the load and for placing said stabilizing capacitor in parallel circuit relation with the load, at least one multilayer semiconductor control device connected in circuit with said tap and said capacitor, and firing circuit means coupled with said multilayer semiconductor control device to fire said device at selected intervals to cause said stabilizing capacitor to discharge through said second winding portion and change the effective volt-second capacity of said saturable reactor for providing a substantially constant output voltage.

3. The voltage stabilizing circuit set forth in claim 2 wherein a feedback means is connected with said firing circuit means to vary the interval in response to deviations in the output voltage from a selected reference value.

4. In a voltage stabilizing circuit for use in conjunction with an alternating potential source, a pair of input leads for connection with the alternating supply, a linear reactor connected in circuit with one of said input leads, a saturable reactor having a tap dividing said saturable reactor into a first and a second winding portion, an impedance element connected in series circuit relationship with one of said winding portions, said impedance element and said saturable reactor being connected in circuit across said input leads, a stabilizing capacitor connected in parallel circuit relation with said impedance element and said saturable reactor, a pair of multilayer control devices connected in inverse parallel relation with each other and in circuit with said tap of said saturable reactor and with one plate of said stabilizing capacitor, means for alternately firing said multilayer control devices at selected intervals to change the effective volt-second capacity of said saturable reactor by causing said stabilizing capacitor to discharge through the second winding portion of said saturable reactor, and output means including leads for connecting said stabilizing capacitor in parallel circuit relation with a load.

5. In a voltage stabilizing circuit for operation from an alternating current source, an input means including leads for connection with the source, a linear reactor connected in circuit with one of said leads, a saturable device having a tap, an impedance element connected in circuit with said saturable device, a stabilizing capacitor, said stabilizing capacitor and linear reactor functioning as an oscillatory circuit, circuit means serially connecting said saturable device and said impedance element in parallel circuit relation with said stabilizing capacitor and in circuit with said input means, at least one multilayer control device connected in circuit with said tap on said saturable device and in circuit with said stabilizing capacitor, means for firing said multilayer control device at selected intervals to cause the stabilizing capacitor to discharge through said second winding portion and change the effective volt-second capacity of said saturable reactor for providing a substantially constant output voltage, and output means including leads for connecting the stabilizing capacitor in circuit with a load.

6. In a voltage stabilizing circuit for operation from a power source, a pair of input leads adapted for connection to the power source, an inductor connected in circuit with one of the input leads, a capacitor connected in circuit with said leads to form an oscillatory circuit with said inductor, an impedance element, a saturable device connected in series circuit with said impedance element across said input leads, said saturable device having a tap, a pair of controlled rectifiers connected in inverse parallel relation with each other and in circuit with said tap of said saturable device and in shunt with said impedance element, and firing circuit means for alternately switching said controlled rectifiers from a nonconducting to a conducting state in alternate half cycles of the power source to cause said stabilizing capacitor to discharge through said second winding portion and change the effective volt-second capacity of said saturable reactor for providing a substantially constant output voltage.

References Cited by the Examiner
UNITED STATES PATENTS

| 2,444,794, | 7/1948 | Uttal et al. | 323—61 |
| 2,709,779 | 5/1955 | Bixby | 323—66 |

MILTON O. HIRSHFIELD, *Primary Examiner.*

LLOYD McCOLLUM, *Examiner.*